US009740254B2

(12) United States Patent
Itou et al.

(10) Patent No.: US 9,740,254 B2
(45) Date of Patent: Aug. 22, 2017

(54) ELECTRONIC CONTROL UNIT

(71) Applicants: DENSO CORPORATION, Kariya, Aichi-pref. (JP); TOYOTA JIDOSHA KABUSHIKI KAISHA, Toyota-shi, Aichi-ken (JP)

(72) Inventors: Akito Itou, Kariya (JP); Naoki Maeda, Nisshin (JP); Masayuki Tsuda, Nagakute (JP); Atsuko Yokoyama, Nagoya (JP)

(73) Assignees: DENSO CORPORATION, Kariya (JP); TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/873,492

(22) Filed: Oct. 2, 2015

(65) Prior Publication Data

US 2016/0098071 A1    Apr. 7, 2016

(30) Foreign Application Priority Data

Oct. 6, 2014    (JP) ................................ 2014-205683

(51) Int. Cl.
| G06F 9/00 | (2006.01) |
| G06F 1/26 | (2006.01) |
| G06F 1/32 | (2006.01) |

(52) U.S. Cl.
CPC ............... *G06F 1/26* (2013.01); *G06F 1/3209* (2013.01)

(58) Field of Classification Search
CPC ................................ G06F 1/26; G06F 1/3209

USPC .................... 713/300, 320, 340, 322; 702/3; 327/143; 714/55
See application file for complete search history.

(56) References Cited

U.S. PATENT DOCUMENTS

| 4,685,023 A * | 8/1987 | Heaston ................ F02D 41/266 |
| | | 361/110 |
| 2004/0162657 A1 | 8/2004 | Ishida | |
| 2004/0181699 A1* | 9/2004 | Katoh ....................... G06F 1/26 |
| | | 713/300 |
| 2005/0132239 A1* | 6/2005 | Athas .................... G06F 1/3203 |
| | | 713/300 |
| 2006/0184812 A1* | 8/2006 | Nguyen ................ G06F 1/3203 |
| | | 713/300 |

(Continued)

FOREIGN PATENT DOCUMENTS

JP    2012-237905 A    12/2012

*Primary Examiner* — Aurel Prifti
(74) *Attorney, Agent, or Firm* — Posz Law Group, PLC

(57) ABSTRACT

An electronic control unit includes a microcomputer and a power circuit that supplies an electric power to the microcomputer. The microcomputer and the power circuit respectively operate in a normal operation mode and in a low power operation mode that consumes less power than the normal operation mode. The electronic control unit further includes a mode switcher for switching the operation modes of the microcomputer and the power circuit according to an input signal from an external device. When a mode switch signal for switching the operation mode of both devices to the normal operation mode, the mode switcher first switches the power circuit to the normal operation mode and subsequently switches the microcomputer to the normal operation mode, which prevents a reset operation of the microcomputer without using a large capacity capacitor.

17 Claims, 3 Drawing Sheets

(56) References Cited

U.S. PATENT DOCUMENTS

| | | | |
|---|---|---|---|
| 2007/0234078 A1* | 10/2007 | Nguyen | G06F 1/26 |
| | | | 713/300 |
| 2008/0184042 A1* | 7/2008 | Parks | G06F 1/3203 |
| | | | 713/300 |
| 2008/0244289 A1* | 10/2008 | LeProwse | G06F 9/441 |
| | | | 713/320 |
| 2009/0198407 A1 | 8/2009 | Sakai et al. | |
| 2010/0058083 A1* | 3/2010 | Rangeley | G06F 1/3203 |
| | | | 713/320 |
| 2010/0327841 A1 | 12/2010 | Ito et al. | |
| 2011/0077865 A1* | 3/2011 | Chen | A61B 5/1117 |
| | | | 702/3 |
| 2011/0225441 A1* | 9/2011 | Chueh | G06F 1/28 |
| | | | 713/340 |
| 2013/0232349 A1* | 9/2013 | Oler | G06F 1/263 |
| | | | 713/300 |
| 2014/0050645 A1* | 2/2014 | Hman | B01D 53/1481 |
| | | | 423/242.1 |
| 2015/0070056 A1* | 3/2015 | Tanadi | H01L 25/117 |
| | | | 327/143 |
| 2016/0098077 A1* | 4/2016 | Itou | G06F 1/3296 |
| | | | 713/322 |
| 2016/0117214 A1* | 4/2016 | Itou | G06F 11/0706 |
| | | | 714/55 |
| 2016/0291625 A1* | 10/2016 | Tripathi | G05F 3/02 |

\* cited by examiner

ELECTRONIC CONTROL UNIT

CROSS REFERENCE TO RELATED APPLICATION

The present application is based on and claims the benefit of priority of Japanese Patent Application No. 2014-205683, filed on Oct. 6, 2014, the disclosure of which is incorporated herein by reference.

TECHNICAL FIELD

The present disclosure generally relates to an electronic control unit including a microcomputer and a power circuit respectively having two operation modes (i.e., a normal mode and a low power consumption mode).

BACKGROUND INFORMATION

A Japanese Patent Laid-Open No. 2009-184423 (patent document 1) described below discloses an electronic control unit, which includes a microcomputer having a normal mode (i.e., a normal operation mode) and a low power consumption mode (i.e., a standby mode) as two operation modes and a power circuit having a normal mode (i.e., a normal electric current mode) and a low power consumption mode (i.e., a low electric current mode) as two operation modes.

According to the patent document 1, the low electric power mode of the microcomputer switches to the normal mode based on an input from an external device. Further, the microcomputer outputs a mode switching signal to the power circuit for the switching of the operation modes (i.e., for the power circuit to switch to the normal mode). Therefore, the microcomputer may be re-started (i.e., wakes up) prior to the switching of the power circuit to the normal mode. To prevent an unintended operation of the microcomputer, which may be due to a voltage drop of the power circuit below an operation guarantee voltage, (i.e., to a lower voltage lower than a normal operation threshold voltage) the microcomputer may start a reset operation.

Such a restart of the microcomputer prior to the switching of the power circuit may be prevented by a capacitor that is added to an output side of the power circuit, which prevents a voltage drop of the power circuit during a switching period to switch to the normal mode. However, to prevent the restart of the microcomputer, a large capacity capacitor is required. In addition, the variation of the electric currents in the capacitor and the microcomputer has to be considered. Therefore, the production cost of the electronic control unit may be increased when the preventive measure for the restart of the microcomputer is implemented. Further, the variation of the electric currents may be caused by various reasons, such as a tolerance of the capacitor, temperature characteristics, an aging of the electronic parts or the like.

SUMMARY

It is an object of the present disclosure to provide an electronic control unit that is capable of preventing the reset operation of the microcomputer at the time of switching of the microcomputer to a normal mode.

The disclosure in the following is about a technical feature of the product for achieving the above-described goal. The numerals in parentheses indicate a relationship between the claim elements and the components in the embodiments, which is merely an example of the disclosure. Therefore, the numerals should not be understood as limiting the disclosure only to such a relationship.

In an aspect of the disclosure, the electronic control unit includes a microcomputer that operates in a normal operation mode of the microcomputer, or in a low power operation mode of the microcomputer that consumes less power than the normal operation mode of the microcomputer, a power circuit that operates in a normal operation mode of the power circuit, or in a low power operation mode of the power circuit that consumes less power than the normal operation mode of the power circuit, and that supplies an electric power for an operation of the microcomputer, and a mode switcher that switches the operation modes of the microcomputer and the operation modes of the power circuit based on an input signal from an external device. When the mode switcher receives from the external device a switch signal for switching the operation modes of both of the microcomputer and the power circuit to the normal operation mode when both of the microcomputer and the power circuit operate in the low power operation mode, the mode switcher first switches the power circuit to the normal operation mode of the power circuit, and subsequently switches the microcomputer to the normal operation mode of the microcomputer.

According to the above, the mode switcher is a different circuit from the microcomputer, and the mode switcher switches the power circuit to the normal mode prior to the switching of the microcomputer. Therefore, at the time of restarting of the microcomputer, the power circuit is already operating in the normal operation, capable of supplying the electric power required for the normal restart operation. Thus, the restart of the microcomputer prior to the mode switching of the power circuit is prevented, and the reset operation of the microcomputer due to the unstable power output (i.e., a lowered voltage of the power circuit) from the power circuit is prevented. Further, the reset operation of the microcomputer is prevented without using a large capacity capacitor.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Hereafter, the embodiment of the present disclosure is described based on the drawings. The same numerals are basically assigned to the same components in each of the embodiments.

First Embodiment

First, a configuration of an electronic control unit concerning the present embodiment is described with reference to FIGS. 1 and 2.

Figure 1:
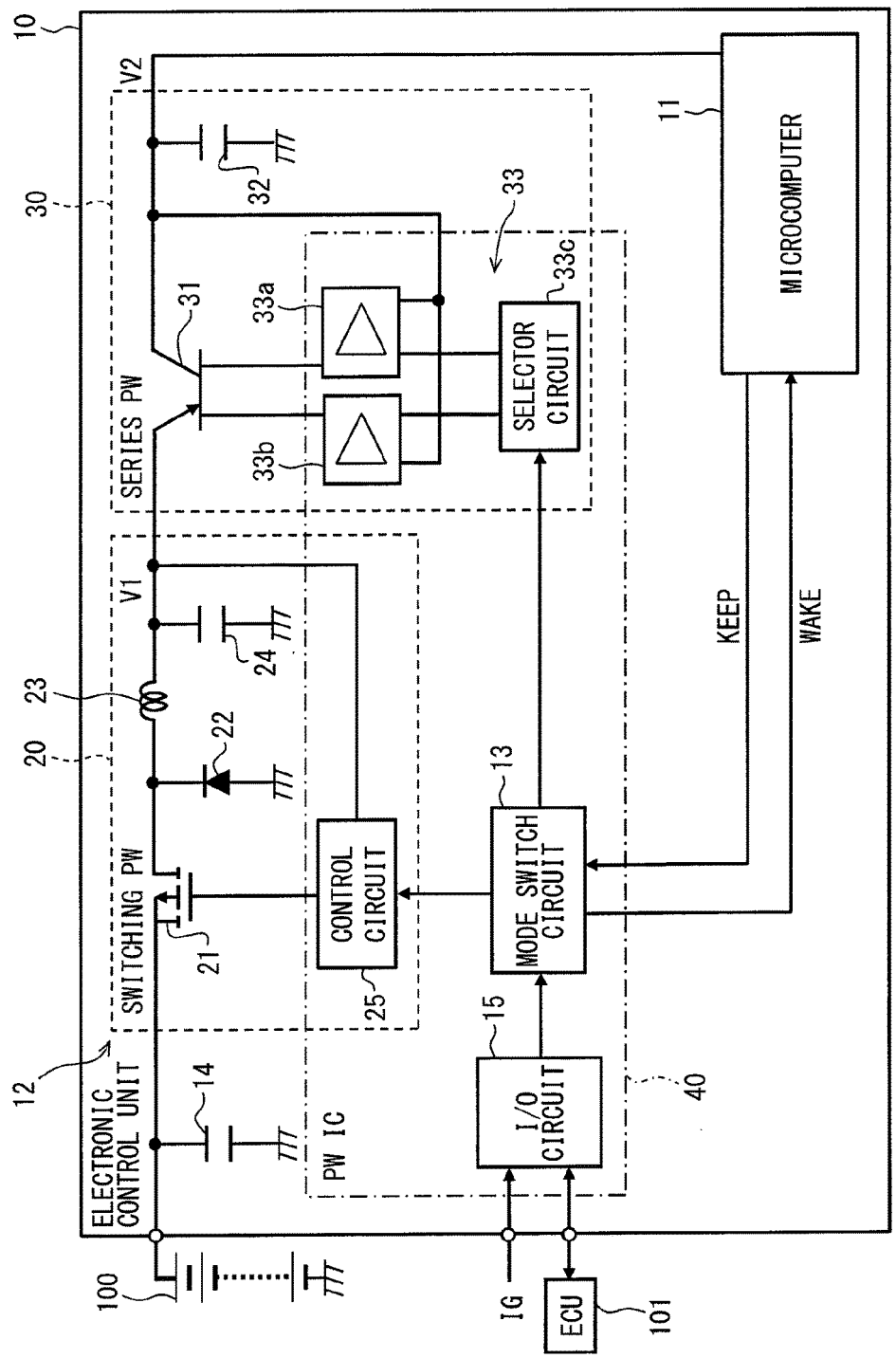
FIG. 1 is a schematic diagram of an electronic control unit concerning a first embodiment of the present disclosure.

An electronic control unit 10 shown in FIG. 1 is disposed in a vehicle. The electronic control unit 10 is provided with a microcomputer 11, a power circuit 12, and a mode switch circuit 13. The electronic control unit 10 is further provided with a capacitor 14 and an input/output circuit 15.

The microcomputer 11 has components such as Central Processing Unit (CPU), Read Only Memory (ROM), Random-Access Memory (RAM), a register, an Input-Output (I/O) port, and the like. In the microcomputer 11, CPU performs signal processing according to various data etc. which are obtained via a bus as well as according to a control program that is pre-memorized in ROM with a help of a memory function of RAM or the register. The signal derived from the signal processing is outputted to the bus. Therefore, the microcomputer 11 performs the various functions.

When the microcomputer 11 of the present embodiment intercepts the power supply of the vehicle, the microcomputer 11 performs an auto-parking control which puts a shift position of the vehicle in a parking position automatically, for example. By the auto-parking control, a parking lock mechanism in the vehicle, which is not illustrated, is operated, to put the vehicle in the locked state, and a travel of the vehicle is restricted.

The microcomputer 11 operates in two operation modes, (i.e., in a normal mode and in a low power mode in which a power consumption is lower than the normal mode). The low power mode may also be called as a waiting mode, or a sleep mode, etc. In the normal mode, the entire microcomputer 11 including the CPU described above is put in operation.

On the other hand, in the low power mode, CPU stops and only some of the I/O ports operate. More practically, from among the I/O ports, a port that detects a pulse edge of a WAKE signal which is mentioned later in detail operates. The electric current consumed by the microcomputer 11 is about 500 mA in the normal mode, and is about 1 mA in the low power mode. Thus, according to the low power mode, the power consumption of the microcomputer 11 is reduced compared with the normal mode.

The power circuit 12 lowers, (i.e., steps down), the voltage of the direct current (i.e., hereafter designated as a battery voltage) supplied from a battery 100 which serves as an external power source disposed in the vehicle, and supplies the direct current as a power source for operating the microcomputer 11. The power circuit 12 has a switching power source 20 and a series power source 30. As the switching power source 20 and the series power source 30, the power sources including a first transistor 21 and a second transistor 31 to be mentioned later are employable.

The switching power source 20 has the first transistor 21, a diode 22, a coil 23, a capacitor 24, and a control circuit 25. The switching power source 20 lowers the battery voltage of 12V down to 6V. The battery voltage is stabilized by the capacitor 14.

According to the present embodiment, a p-channel type Metal Oxide Semiconductor Field Effect Transistor (MOSFET) is adopted as the first transistor 21. The source of MOSFET is connected to a capacitor 14 side (i.e., to a battery 100 side), and the drain of MOSFET is connected to the coil 23. The gate of MOSFET is connected to the control circuit 25.

The diode 22 is connected to a junction point between the first transistor 21 and the coil 23, with its anode put on a ground side. Further, the capacitor 24 is connected to, i.e., is put on, a downstream of the coil 23 for stabilizing an output voltage V1 of the first transistor 21. The capacitor 24 accumulates the electric charge that corresponds to the output voltage V1 of the switching power source 20.

The control circuit 25 operates in the following manner. When a switch signal to switch to the normal mode is input from the mode switch circuit 13, the control circuit 25 generates a Pulse Width Modulation (PWM) signal with a preset duty by using a clock that is input from a not-illustrated oscillation circuit, so that the output voltage V1 of the switching power source 20 is set to 6V, and controls the switching operation of the first transistor 21 by performing a feedback control. According to the PWM signal, an ON/OFF control of the first transistor 21 is performed periodically.

When the first transistor 21 is turned ON, the electric current based on the battery voltage flows through the first transistor 21. The electric current charges the capacitor 24, while accumulating energy in the coil 23. When the first transistor 21 is turned OFF, the flow of the electric current based on the battery voltage is intercepted. In such case, the electric current flows into the capacitor 24 via the diode 22 and the coil 23 by the energy accumulated in the coil 23. Since the first transistor 21 is turned ON and turned OFF by the preset duty, the output voltage generated by the capacitor 24 (i.e., the output voltage V1) is set to 6V which is lower than the battery voltage.

On the other hand, when a switch signal to switch to the low power mode is inputted from the mode switch circuit 13, the control circuit 25 will not generate the PWM signal. That is, a switching operation of the first transistor 21 is not performed. Thereby, power consumption of the control circuit 25 is reduced. Further, a supply of the clock is stopped, the first transistor 21 is kept in an OFF state or in an ON state (i.e., in an always-ON or always-OFF state). In the present embodiment, when the switch signal to switch to the low power mode is inputted, the control circuit 25 is controlled so that the first transistor 21 is always set to ON. Therefore, the output voltage V1 is set to 12V in the low power mode.

The series power source 30 has a second transistor 31, a capacitor 32, and a control circuit 33. The series power source 30 lowers, steps down, the voltage of the output voltage V1 (6V) of the switching power source 20 down to 5V.

According to the present embodiment, a PNP type bipolar transistor is adopted as the second transistor 31. The emitter of the bipolar transistor is connected to the capacitor 24 of the switching power source 20, and the collector thereof is connected to the microcomputer 11. The base of the bipolar transistor is connected to the control circuit 33. The capacitor 32 is connected to, (i.e., is put on), a downstream of the second transistor 31 for stabilizing an output voltage V2 of the series power source 30. The capacitor 32 accumulates the electric charge corresponding to the output voltage V2 of the series power source 30.

The control circuit 33 has a low precision control circuit 33a, a high precision control circuit 33b, and a selector circuit 33c. The low precision control circuit 33a has an operational amplifier and a reference voltage source, compares the output voltage V2 with a reference voltage (4.6V), and adjusts the base current so that the output voltage V2 of the series power source 30 is set to 4.6V. The low precision control circuit 33a has a function for outputting 4.6V only, and is formed by about tens of elements (for example, 50 pieces). Thus, the low precision control circuit 33a has a minimum configuration as a feedback circuit for outputting 4.6V.

The high precision control circuit 33b has an operational amplifier and a reference voltage source, compares the output voltage V2 with a reference voltage (5V), and adjusts the base current so that the output voltage V2 of the series power source 30 is set to 5V. Further, the high precision control circuit 33b has a function for controlling output voltage with high precision to decrease various fluctuation of battery voltage, and for controlling output voltage with high precision conditioned on the load variation (i.e., a voltage variation on a microcomputer 11 side), and a function for handling the consumed electric current (500 mA) of the microcomputer 11 in the normal mode. Therefore, the high precision control circuit 33b can improve in the precision of the output voltage V2 (i.e., the precision of the power source supplied to the microcomputer 11). However, the high precision control circuit 33b consumes much more power than the low precision control circuit 33a, because the high precision control circuit 33b is formed by hundreds of elements (for example, 300 pieces).

The selector circuit 33c selects either of the low precision control circuit 33a or the high precision control circuit 33b as a circuit which operates in order to adjust the base current based on the mode switching signal from the mode switch circuit 13.

When a switch signal from the mode switch circuit 13 is inputted for the switching to the normal mode, the selector circuit 33c selects the high precision control circuit 33b as a circuit which operates in order to adjust the base current. The high precision control circuit 33b adjusts the base current of the second transistor 31 (i.e., a PNP type bipolar transistor) so that the output voltage V2 of the series power source 30 is set to 5V. Since the electric current according to the base current flows into the second transistor 31, the electric current charges the capacitor 32. Thereby, the output voltage generated by the capacitor 32, (i.e., the output voltage V2), is set to 5V, which is lower than the output voltage V1.

On the other hand, when the switch signal from the mode switch circuit 13 is inputted to switch to the low power mode, the selector circuit 33c selects the low precision control circuit 33a as a circuit which operates in order to adjust the base current. The low precision control circuit 33a adjusts the base current of the second transistor 31 (i.e., a PNP type bipolar transistor) so that the output voltage V2 of the series power source 30 is set to 4.6V. Thereby, the output voltage generated by the capacitor 32, (i.e., output voltage V2), is set to 4.6V, which is lower than the output voltage V1. In terms of resetting, the microcomputer 11 is reset when the power source voltage falls to be lower than 4V.

The mode switch circuit 13 switches the operation mode of the microcomputer 11 and the power circuit 12 from the low power mode to the normal mode based on an input from external devices. The signal is inputted to the mode switch circuit 13 from the external devices via the input/output circuit 15. The input/output circuit 15 receives an input of a certain switch signal, e.g., an ignition signal IG representing a state (i.e., ON or OFF) of the ignition switch or the like. The switch signal is compared with a threshold value in the input/output circuit 15, and the comparison result is outputted to the mode switch circuit 13. Further, the input/output circuit 15 is connected to a second Electronic Control Unit (ECU) 101 via a communication line, which is different from the electronic control unit 10, and serves as a communication circuit for communicating with ECU 101.

ECU 101 may be a door ECU, which detects opening and closing of the vehicle door, or may be a remote ECU, which communicates with a remote key when a user carrying the key approaches the vehicle, for example.

In terms of a communication method for communication between the electronic control unit 10 and ECU 101, LIN (i.e., Local Interconnect Network) communication, CAN (Controller Area Network) communication, or the like are employable. CAN is a registered trademark.

When a certain start condition is fulfilled, (i.e., when a signal is transmitted from ECU 101, or when the ignition signal IG or the like switches to an ACTIVE state), the mode switch circuit 13 outputs a WAKE signal, (i.e., a wake-up signal) for the switching from the low power mode to a communication mode. The WAKE signal is a pulse signal. The microcomputer 11 detects a rising edge of the pulse signal or a falling edge of the pulse signal, for starting the start process. After completing the start process, the microcomputer 11 outputs, to the mode switch circuit 13, a complete signal that indicates a completion of the start process and a completion of switching to the normal mode, which is designated as a KEEP signal hereafter (i.e., as an ACTIVE logic).

The mode switch circuit 13 outputs a normal mode switch signal to the control circuits 25 and 33 of the power circuit 12, in order to switch from the low power mode to the normal mode. Thereby, the control circuit 25 generates a PWM signal of the preset duty, so that the output voltage V1 of the switching power source 20 is set to 6V, and performs a feedback control for the switching operation of the first transistor 21. Further, the selector circuit 33c selects the high precision control circuit 33b, and the base current of the second transistor 31 is adjusted by the high precision control circuit 33b, so that the output voltage V2 of the series power source 30 is set to 5V.

On the other hand, the microcomputer 11 performs an end process, when a predetermined end condition set up in advance is fulfilled. When the end process is completed and the operation mode is switched to the low power mode, the microcomputer 11 outputs, as a KEEP signal, (i.e., as an INACTIVE logic). Thereby, the mode switch circuit 13 outputs a signal to the control circuits 25 and 33 for switching the operation mode of the power circuit 12 from the normal mode to the low power mode. In such manner, the control circuit 25 performs a control that puts the first transistor 21 in an always-ON state. Further, the selector circuit 33c selects the low precision control circuit 33a, and the base current of the second transistor 31 is adjusted by the low precision control circuit 33a, so that the output voltage V2 of the series power source 30 is set to 4.6V.

As indicated by a one-dot chain line in FIG. 1, the mode switch circuit 13, the input/output circuit 15, the control circuit 25 of the switching power source 20, and the control circuit 33 of the series power source 30 are integrated in one IC chip, to provide a power IC 40 in the present embodiment. Thus, the control circuits 25 and 33 which control the drive of the transistors 21 and 31 in the power circuit 12 are formed in the power IC 40.

Figure 2:
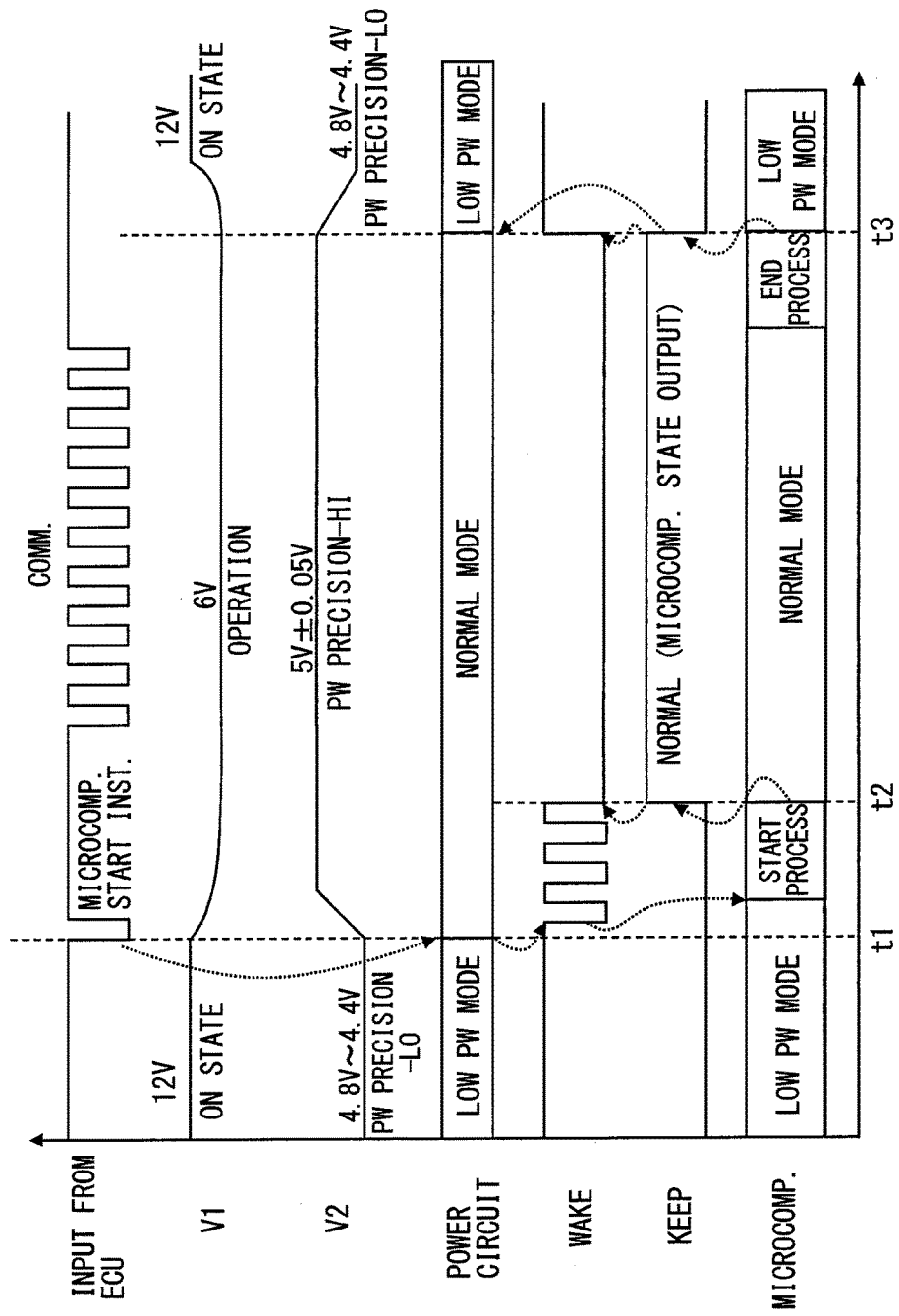
FIG. 2 is a timing chart of an operating state of a microcomputer and other components.

Next, based on a timing chart in FIG. 2, operation of the above-mentioned electronic control unit 10 is described.

FIG. 2 illustrates a situation, in which the operation mode is switched to the normal mode according to an input from ECU 101.

Before time t1, the power circuit 12 operates in the low power mode. As described above, the control circuit 25 in the low power mode performs a control that puts the first transistor 21 in an always-On state, instead of performing a PWM control. Thereby, the power consumption of the switching power source 20 is reduced. Further, the output voltage V1 of the switching power source 20 is set to the 12V, which is the same as the battery voltage.

The selector circuit 33c selects the low precision control circuit 33a, and the low precision control circuit 33a controls the base current of the second transistor 31, so that the output voltage V2 of the series power source 30 is set to 4.6V. Thereby, the output voltage V2 is set to 4.6V±0.2V (i.e., 4.4V-4.8V).

Since the circuit configuration of the low precision control circuit 33*a* is simple, (i.e., simpler than the configuration of the high precision control circuit 33*b*), the power consumption of the low precision control circuit 33*a* is reduced than the high precision control circuit 33*b*.

More specifically, the power circuit precision is configured to be reduced/lowered for the low precision control circuit 33*a*, in comparison to the high precision control circuit 33*b* (i.e., a variation of the voltage is greater in the low precision control circuit 33*a* than in the high precision control circuit 33*b*). Therefore, due to the simpler circuit configuration and the low voltage variation, the power consumption by the low precision control circuit 33*a* is reduced.

In addition, the low precision control circuit 33*a* controls the base current of the second transistor 31, so that the output voltage V2 is set to 4.6V which is lower than 5V for the normal mode. Thereby, the power consumption by the low precision control circuit 33*a* is further reduced.

Before time t1, the microcomputer 11 also operates in the low power mode. In the low power mode, CPU of the microcomputer 11 stops to operate, and some of the ports receiving an input of the WAKE signal operate, among the I/O ports. Therefore, the power consumption of the microcomputer 11 is reduced.

Since the power consumption of the microcomputer 11 is reduced to the minimum, it is not necessary to supply 5V for the microcomputer 11 in the low power mode.

Further, since the microcomputer 11 is reset at 4V, the output voltage V2 of the series power source 30 is set to 4.6V±0.2V (i.e., 4.4V-4.8V), as described above.

In the low power mode, the mode switch circuit 13 outputs a high-level signal as the WAKE signal to the microcomputer 11. Therefore, the microcomputer 11 will not be started.

On the other hand, the microcomputer 11 outputs a low-level signal as the KEEP signal (i.e., an INACTIVE logic) to the mode switch circuit 13 (i.e., the power IC 40).

In time t1, a start instruction signal (i.e., a pulse) for starting the microcomputer 11 is inputted from ECU 101. When the mode switch circuit 13 detects the falling edge or the rising edge of the pulse, the start condition is fulfilled. When the start condition is fulfilled, the mode switch circuit 13 first outputs, to the power circuit 12, a normal mode switching signal for switching from the low power mode to the normal mode.

The mode switch circuit 13 outputs, for example, a high-level signal as the normal mode switching signal to the power circuit 12. When the normal mode switching signal is inputted, the control circuit 25 generates the PWM signal of the preset duty, and performs a feedback control for the switching operation of the first transistor 21, so that the output voltage V1 of the switching power source 20 is set to 6V. Thereby, the output voltage V1 gradually falls from 12V, down to 6V eventually.

Further, when the normal mode switching signal is inputted, the selector circuit 33*c* selects the high precision control circuit 33*b*. After the selection, the high precision control circuit 33*b* adjusts the base current of the second transistor 31, so that the output voltage V2 of the series power source 30 is set to 5V. As described above, the high precision control circuit 33*b* has a higher control precision than the low precision control circuit 33*a* for the control of the voltage (i.e., the variation of the voltage is small). Therefore, the output voltage V2 gradually rises from a value in the low power mode, and eventually rises to 5V±0.05V.

After a lapse of a preset time from time t1, the mode switch circuit 13 outputs the pulse signal as a WAKE signal to the microcomputer 11. According to the present embodiment, the pulse signal is output at a preset interval (e.g., at an interval of 4 ms), instead of outputting the pulse signal only once. Then, if no ACTIVE logic is inputted into the mode switch circuit 13 as a KEEP signal for a preset period (e.g., for 300 ms after time t1), the mode switch circuit 13 stops to output the pulse, and returns to the low power mode (i.e., outputs the high-level signal).

The microcomputer 11 starts the start process, when the falling edge or the rising edge of the WAKE signal (i.e., the pulse signal) is detected. In FIG. 2, the microcomputer 11 detects the falling edge of the first pulse, and starts the start process. Then, at time t2, the start process is completed.

When the start process is completed, the operation mode of the microcomputer 11 turns to the normal mode. Therefore, after time t2, the electronic control unit 10 communicates with ECU 101, and the microcomputer 11 performs a preset process.

Further, the microcomputer 11 outputs, to the mode switch circuit 13, a high-level signal (i.e., an ACTIVE logic) as the KEEP signal when the start process completes. When the high-level signal serving as the KEEP signal is inputted to the mode switch circuit 13, the mode switch circuit 13 stops the output of the pulse signal, and outputs a low-level signal as the WAKE signal.

When communication with ECU 101 is completed and the predetermined end condition is fulfilled, the microcomputer 11 starts the end process. After the end process is completed at time t3, the microcomputer 11 operates in the low power mode.

When the microcomputer 11 operates in the low power mode, the KEEP signal turns to be a low-level signal (i.e., an INACTIVE logic), and the WAKE signal turns to be a high-level signal.

When the KEEP signal inputted to the mode switch circuit 13 changes to a low level, the mode switch circuit 13 outputs, to the power circuit 12, a signal for the switching from the normal mode to the low power mode (e.g., a low-level signal). When the signal for the switching to the low power mode is input, the control circuit 25 puts the first transistor 21 in the always-ON state. Thereby, the output voltage V1 gradually rises from 6V, and settles in 12V eventually.

When a signal for the switching to the low power mode is inputted, the selector circuit 33*c* selects the low precision control circuit 33*a*. The low precision control circuit 33*a* controls the base current of the second transistor 31, so that the output voltage V2 of the series power source 30 is set to 4.6V. Thereby, the output voltage V2 gradually falls from 5V, and is eventually set to 4.6V±0.2V.

The effect of the electronic control unit 10 concerning the present embodiment is described in the following.

According to the present embodiment, the electronic control unit 10 is provided with the mode switch circuit 13 separately from the microcomputer 11. The mode switch circuit 13 is formed as a part of the power IC 40. When switching from the low power mode to the normal mode based on the input from the external devices, the mode switch circuit 13 switches the power circuit 12 to the normal mode prior to the switching of the microcomputer 11 to the normal mode. Therefore, when the microcomputer 11 starts the start process, the power circuit 12 already operating in the normal mode, and the power circuit 12 can supply the electric power required at the time of starting of the microcomputer 11. Therefore, when switching from the low power mode to the normal mode, resetting of the microcomputer due to the fall of the power source voltage is prevented. Further, the prevention of the resetting of the microcomputer is enabled without using a large capacity capacitor.

In the low power mode, CPU of the microcomputer 11 stops and some of the I/O ports operate. Thereby, the power consumption of the microcomputer 11 in the low power mode is reduced than the normal mode, while enabling a detection of the WAKE signal (i.e., a pulse) that indicates a start instruction for starting the microcomputer 11.

In the low power mode, the control circuit 25 of the switching power source 20 does not generate the PWM signal. That is, the PWM control of the first transistor 21 is not performed. Therefore, the power consumption of the switching power source 20 in the low power mode is reduced than the normal mode.

Specifically, in the present embodiment, the control circuit 25 puts the first transistor 21 to be in the always-ON state. In the always-OFF state, the output voltage V1 is set to 0V. When switching from the low power mode to the normal mode, for the accumulation of the electric charge in the capacitor 24 by turning ON and OFF of the first transistor 21, it takes time to raise the voltage from 0V to 6V.

As described above, the always-ON state of the first transistor 21 enables the reduction of the start time, (i.e., time required for the switching power source 20 to output the output voltage V1 of 6V), in comparison to the always-OFF state. For example, the start time may substantially be reduced to 1/10.

In the low power mode, the series power source 30 adjusts the base current of the second transistor 31 by using the low precision control circuit 33a. The low precision control circuit 33a has the circuit configuration simpler than the high precision control circuit 33b. Thereby, the power consumption of the series power source 30 in the low power mode is reduced than the normal mode.

Specifically in the present embodiment, the required precision of the low precision control circuit 33a for supplying the electric current/power is lower than the required precision of the high precision control circuit 33b for supplying the electric current/power. Therefore, the circuit configuration of the low precision control circuit 33a is simplified compared to that of circuit 33b, thereby further reducing the power consumption of the series power source 30.

The low precision control circuit 33a controls the base current of the second transistor 31, for having the output voltage V2 of 4.6V which is lower than 5V in the normal mode. In other words, while maintaining the output voltage to be in a range that prevents the resetting of the microcomputer 11, the output voltage is lowered from the normal mode by the control/adjustment of the base current of the second transistor 31. Therefore, the base current is controlled to be smaller than the normal mode, and the power consumption of the series power source 30 is further reduced.

The mode switch circuit 13 outputs the pulse signal as a WAKE signal to the microcomputer 11, when an input signal from the external devices fulfills the start condition of the microcomputer 11. The mode switch circuit 13 outputs the pulse signal until a signal (i.e., a KEEP signal) that indicates the completion of the switching to the normal mode is inputted from the microcomputer 11. Therefore, even when the I/O port of the microcomputer 11 fails to read an edge of the first pulse, the microcomputer 11 is securely started.

Second Embodiment

Figure 3:
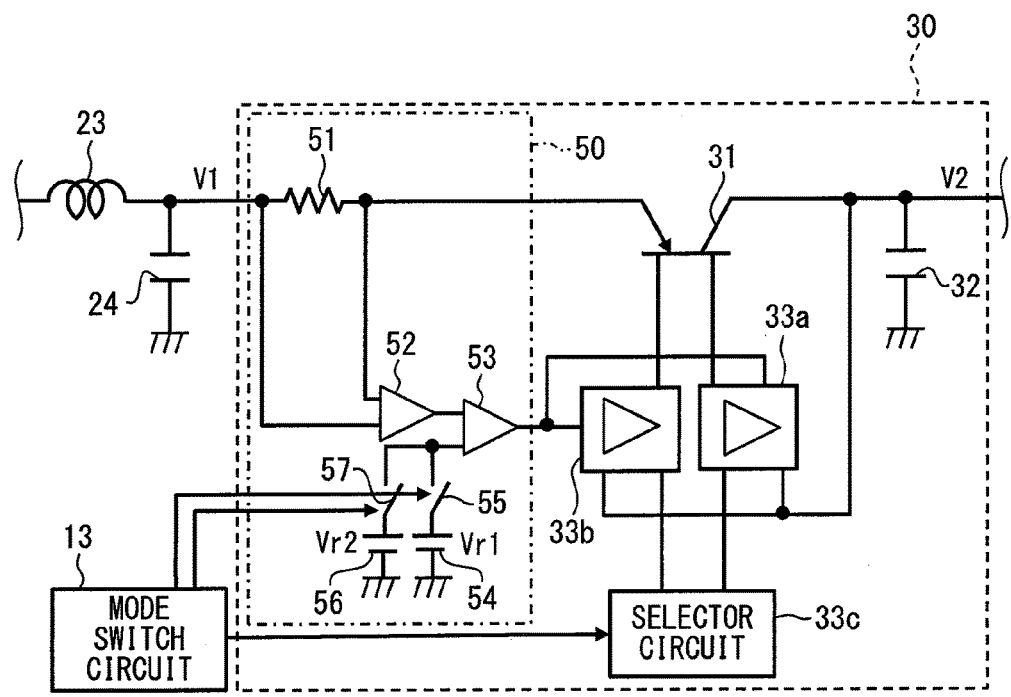
FIG. 3 is a schematic diagram of a series power circuit in the electronic control unit concerning a second embodiment of the present disclosure.

In the present embodiment, the description is focused to a difference of the electronic control unit 10 in the preceding embodiment. FIG. 3 shows a portion of the electronic control unit 10 regarding a series power source concerning the present embodiment.

As shown in FIG. 3, the series power source 30 of the electronic control unit 10 has an excessive current detector circuit 50 that compares the electric current flowing through the second transistor 31 with a predetermined threshold value and detects the excessive electric current. The other configuration other than the above is the same as the first embodiment.

In the present embodiment, the first transistor 21 of the switching power source 20 is also put in the always-ON state, just like the first embodiment. The excessive current detector circuit 50 is formed as a part of the above-mentioned power IC 40.

The excessive current detector circuit 50 has a resistor 51, a differential amplifier 52, a comparator 53, a first reference power source 54 that generates a first threshold value Vr1, a first switch 55, a second reference power source 56 that generates a second threshold value Vr2 which is a voltage lower than first threshold value Vr1, and a second switch 57.

The resistor 51 is disposed at a position between the coil 23 and the second transistor 31. The voltage between the two terminals of the resistor 51 is inputted to the differential amplifier 52, and the output of the differential amplifier 52 is inputted to one of the input terminals of the comparator 53. According to the operation mode, the first threshold value Vr1 or the second threshold value Vr2 is inputted to the other input terminal of the comparator 53.

Between the input terminals of the comparator 53 and the ground, the first reference power source 54 and the first switch 55 are arranged in series. Further, in parallel with a series circuit of the first reference power source 54 and the first switch 55, a series circuit of the second reference power source 56 and the second switch 57 is arranged.

When the normal mode switching signal is outputted from the mode switch circuit 13, the first switch 55 is set to ON (i.e., is put in a closed state), and the second switch 57 is set to OFF (i.e., is put in an open state). Thereby, the first threshold value Vr1 (e.g., 60 mV) is inputted to the comparator 53. Thus, in the normal mode, the excessive current detector circuit 50 detects an excessive electric current by a comparison with the first threshold value Vr1.

On the other hand, when a signal for the switching to the low power mode is outputted from the mode switch circuit 13, the first switch 55 is set to OFF (i.e., is put in an open state), and the second switch 57 is set to ON (i.e., is put in a closed state). Thereby, the second threshold value Vr2 (e.g., 30 mV) is inputted to the comparator 53. Thus, in the low power mode, the excessive current detector circuit 50 detects an excessive electric current by a comparison with the second threshold value Vr2.

The output of the comparator 53 is inputted to the low precision control circuit 33a and to the high precision control circuit 33b, respectively. When an excessive electric current is detected in the normal mode, the drive of the high precision control circuit 33b is stopped according to the output from the comparator 53. Further, when an excessive electric current is detected in the low power mode, the drive of the low precision control circuit 33a is stopped according to the output from the comparator 53.

The effect of the electronic control unit 10 concerning the present embodiment is described in the following.

As described in the first embodiment, when the first transistor 21 is put in the always-ON state in the low power mode, the output voltage V1 is set to 12V, and the voltage drop in the series power source 30 will become large.

When the threshold value used in the comparator 53 is a constant value, (i.e., a threshold value for the normal mode and a threshold value for the low power mode are the same), an excessive electric current flowing in the low power mode may lead to a large power consumption due to the large voltage drop described above, thereby causing a large loss that exceeds an allowable loss of the second transistor 31.

On the other hand, according to the present embodiment, in the low power mode, the excessive electric current is detected based on the second threshold value Vr2, (i.e., a value lower than the first threshold value Vr1 for the normal mode). In other words, the threshold value is lowered in the low power mode. Therefore, in low power mode, a determination of an excessive electric current is performed based on a smaller value than the normal mode, for stopping the drive of the low precision control circuit 33a, (i.e., for the switching OFF of the second transistor 31).

Although the present disclosure has been described in connection with preferred embodiment thereof with reference to the accompanying drawings, it is to be noted that various changes and modifications will become apparent to those skilled in the art.

The electronic control unit 10 is not necessarily limited to an electronic control unit which performs the auto-parking control.

The electronic control unit 10 may have other microcomputers, other than the microcomputer 11 which performs the auto-parking control.

In the low power mode, some of the I/O ports operate among others in the microcomputers 11 in the above embodiment. However, the configuration of the I/O ports is not necessarily limited to the above. That is, as long as the power consumption is reduced in the low power mode, other configurations may be adoptable as long as CPU is put in the stop state, at least.

In the low power mode, only the first transistor 21 of the switching power source 20 in the power circuit 12 is put in the always-ON state in the above embodiment. However, the first transistor 21 may be put in the always-OFF state. That is, in the low power mode, other configurations may be adoptable as long as the power consumption of the switching power source 20 is reduced than the normal mode.

In the above embodiment, the low precision control circuit 33a is, among other circuits in the power circuit 12, used as the control circuit 33 which constitutes, (i.e., serves as), the series power source 30 in the low power mode, and the high precision control circuit 33b is, among other circuits in the power circuit 12, used as the control circuit 33 which constitutes, (i.e., serves as), the series power source 30 in the normal mode.

However, the configuration is not necessarily limited to the above-described operation-mode-dependent switching between the low precision control circuit 33a and the high precision control circuit 33b.

Other configurations may be adoptable as long as the power consumption of the series power source 30 is reduced than the normal mode.

The power consumption may be reduced in the low power mode, without reducing the precision of the power circuit.

The mode switch circuit 13 in the above embodiment outputs the pulse signal as the WAKE signal until obtaining a signal that indicates a completion of the switching to the normal mode as the KEEP signal (i.e., until obtaining the completion signal that indicates a completion of the start process).

However, the mode switch circuit 13 may be configured to output, as the WAKE signal, only one pulse to the microcomputer 11 when the start instruction signal of the microcomputer 11 is inputted from the external devices.

Such changes, modifications, and summarized schemes are to be understood as being within the scope of the present disclosure as defined by appended claims.

What is claimed is:

1. An electronic control unit comprising:
a microcomputer operating in a normal operation mode of the microcomputer, or in a low power operation mode of the microcomputer that consumes less power than the normal operation mode of the microcomputer;
a power circuit operating in a normal operation mode of the power circuit, or in a low power operation mode of the power circuit that consumes less power than the normal operation mode of the power circuit, and supplying an electric power for an operation of the microcomputer;
a mode switcher switching the operation modes of the microcomputer and the operation modes of the power circuit based on an input signal from an external device, wherein
when the mode switcher receives from the external device a switch signal for switching the operation modes of both of the microcomputer and the power circuit to the normal operation mode when both of the microcomputer and the power circuit operate in the low power operation mode, the mode switcher first switches the power circuit to the normal operation mode of the power circuit, and subsequently switches the microcomputer to the normal operation mode of the microcomputer; and
the power circuit includes a switching power source that includes a first transistor and a control circuit of the switching power source, and a series power source connected to the switching power source, the series power source includes a second transistor and a control circuit of the series power source, and
the mode switcher is connected to both of the switching power source and the series power source of the power circuit.

2. The electronic control unit of claim 1, wherein
a precision of the power circuit in the low power operation mode of the power circuit is configured to be lower than a precision of the power circuit in the normal operation mode of the power circuit.

3. The electronic control unit of claim 1, wherein
the mode switcher outputs a pulse signal to the microcomputer when switching the low power operation mode of the microcomputer to the normal operation mode of the microcomputer,
the microcomputer switches to the normal operation mode of the microcomputer by detecting a rising edge of the pulse signal or a falling edge of the pulse signal, and outputs to the mode switcher a switch complete signal that indicates that switching to the normal operation mode of the microcomputer is complete, and
the mode switcher outputs the pulse signal until the mode switcher receives the switch complete signal.

4. The electronic control unit of claim 1, wherein
the power circuit includes a switching power source that has a first transistor for a switching operation and performs a step-down of a supply voltage from an external power source, and a series power source that has a second transistor for performing a step-down of an output voltage of the switching power source, and
when the switch signal is input from the mode switcher to the power circuit to switch to the low power operation mode of the power circuit, the switching power source puts the first transistor in an always-on state.

5. The electronic control unit of claim 4 further comprising:
an excessive current detector detecting an excessive electric current based on a comparison between an electric current flowing in the second transistor and a preset threshold, wherein
when the switch signal to switch to the low power operation mode of the power circuit is input to the excessive current detector, the excessive current detector detects the excessive electric current by using a second threshold that is lower than a first threshold that is used as a preset threshold of the normal operation mode of the power circuit.

6. The electronic control unit of claim 1, wherein
the mode switcher first switches the power circuit to the normal operation mode of the power circuit, and subsequently switches the microcomputer to the normal operation mode of the microcomputer, upon the mode switcher receiving from the external device a switch signal to switch the operation modes of both of the microcomputer and the power circuit to the normal operation mode, while both of the microcomputer and the power circuit are operating in the low power operation mode.

7. The electronic control unit of claim 1, wherein the external device is different from the microcomputer, the mode switcher, and the power circuit.

8. The electronic control unit of claim 1, wherein
the external device is an ancillary vehicle electronic control unit that outputs the switch signal to the mode switcher.

9. The electronic control unit of claim 1, wherein
the mode switcher is a mode switching circuit that electrically connects the microcomputer to the power circuit.

10. The electronic control unit of claim 1, wherein
the mode switcher switches the power circuit to the normal operation mode of the power circuit prior to switching the microcomputer to the normal operation mode of the microcomputer to prevent the microcomputer from resetting.

11. The electronic control unit of claim 1, wherein
the mode switcher outputs a pulse signal in response to the power circuit entering into the normal operation mode of the power circuit, and
the microcomputer initiates a start process in response to detecting a raising edge or a falling edge of the pulse signal output from the mode switcher and switches to a normal operation mode after the start process is complete.

12. The electronic control unit of claim 1 further comprising
a vehicle electronic control unit that includes the microcomputer, the power circuit, and the mode switcher, the vehicle electronic control unit is different from the external device that outputs the switch signal.

13. The electronic control unit of claim 12, wherein
the vehicle electronic control unit is electrically connected to an ancillary vehicle electronic control unit that detects a predetermined condition to switch between the normal mode and the low power mode and outputs an operation signal to the vehicle electronic control unit in response to detecting the predetermined condition.

14. The electronic control unit of claim 12, wherein
the vehicle electronic control unit is configured to perform an auto-parking control of a vehicle in response to receiving the operation signal from the ancillary electronic control unit.

15. The electronic control unit of claim 13, wherein
the ancillary electronic control unit is a vehicle door electronic control unit.

16. The electronic control unit of claim 14, further comprising
an integrated circuit power chip that includes the mode switch circuit, the control circuit of the switching power source, and the control circuit of the series power source and that is electrically connected to the external device to receive the switch signal from the external device.

17. The electronic control unit of claim 1, wherein
the mode switch circuit outputs a pulse signal after the power circuit is in the normal operation mode of the power circuit for a first predetermined time,
the microcomputer performs a start process in response to detecting a falling edge or a rising edge of the pulse signal from the mode switcher and subsequently outputs a normal operation mode state signal to the mode switcher, wherein
the mode switch circuit stops outputting the pulse signal in response to the normal operation mode state signal from the microcomputer.

* * * * *